(12) United States Patent
Bauchot et al.

(10) Patent No.: US 11,151,180 B2
(45) Date of Patent: *Oct. 19, 2021

(54) MESSAGING DIGEST

(71) Applicant: International Business Machines Corporation, Armonk, NY (US)

(72) Inventors: Frederic Bauchot, Saint-Jeannet (FR); Jean-Yves Clement, Saint-Jeannet (FR); Isabelle Murard, Vence (FR)

(73) Assignee: International Business Machines Corporation, Armonk, NY (US)

( * ) Notice: Subject to any disclaimer, the term of this patent is extended or adjusted under 35 U.S.C. 154(b) by 286 days.

This patent is subject to a terminal disclaimer.

(21) Appl. No.: 16/375,909

(22) Filed: Apr. 5, 2019

(65) Prior Publication Data
US 2019/0236087 A1 Aug. 1, 2019

Related U.S. Application Data

(63) Continuation of application No. 15/830,444, filed on Dec. 4, 2017, now Pat. No. 10,331,723, which is a (Continued)

(30) Foreign Application Priority Data

Dec. 24, 2013 (GB) .................................... 1322987

(51) Int. Cl.
*G06F 16/00* (2019.01)
*G06F 16/35* (2019.01)
*H04L 12/58* (2006.01)

(52) U.S. Cl.
CPC ............ *G06F 16/353* (2019.01); *H04L 51/18* (2013.01); *H04L 51/32* (2013.01)

(58) Field of Classification Search
CPC . G06F 17/353; G06F 16/353; H04L 51/18–32
See application file for complete search history.

(56) References Cited

U.S. PATENT DOCUMENTS 5,913,215 A * 6/1999 Rubinstein .......... G06F 16/3323
707/708
8,527,597 B2 9/2013 Kennberg et al.
(Continued)

OTHER PUBLICATIONS

Josh Catone, Social Media, Twitter Better: 20 Ways to Filter Your Tweets, Jul. 3, 2009, http://mashable.com/2009/07/03/twitter-filter/, 16 pages.
(Continued)

*Primary Examiner* — Leslie Wong
(74) *Attorney, Agent, or Firm* — Schmeiser, Olsen & Watts LLP; Nicholas L. Cadmus

(57) ABSTRACT

A method and system. A first interest value is determined. The first interest value is associated with a first combination of one or more concepts derived from one or more word objects extracted from a message on which an action is to be performed. The first interest value is determined to be at least a specified first threshold value and in response, a concept interest dataset is updated. The concept interest dataset prior to being updated includes combinations of at least one concept. Each concept of the at least one concept has been derived from a previous processing of messages. The updated concept interest dataset includes the first combination and a cumulative interest value that encompasses the first interest value.

20 Claims, 9 Drawing Sheets

Related U.S. Application Data continuation of application No. 14/541,728, filed on Nov. 14, 2014, now Pat. No. 9,904,728.

(56) References Cited

U.S. PATENT DOCUMENTS

| | | | | |
|---|---|---|---|---|
| 8,719,302 | B2* | 5/2014 | Bailey | H04L 51/32 |
| | | | | 707/790 |
| 8,972,396 | B1* | 3/2015 | Zhang | G06F 16/951 |
| | | | | 707/731 |
| 9,323,826 | B2* | 4/2016 | Bailey | G06F 16/35 |
| 9,904,728 | B2* | 2/2018 | Bauchot | G06F 16/353 |
| 10,003,560 | B1* | 6/2018 | Perkins | H04L 51/32 |
| 10,331,723 | B2* | 6/2019 | Bauchot | H04L 51/18 |
| 2008/0033982 | A1* | 2/2008 | Parikh | G06F 16/24575 |
| 2008/0140657 | A1* | 6/2008 | Azvine | G06F 16/338 |
| 2010/0312769 | A1* | 12/2010 | Bailey | G06F 16/35 |
| | | | | 707/740 |
| 2011/0145348 | A1* | 6/2011 | Benyamin | H04L 51/32 |
| | | | | 709/206 |
| 2011/0246457 | A1* | 10/2011 | Dong | G06Q 10/06 |
| | | | | 707/725 |
| 2012/0001919 | A1* | 1/2012 | Lumer | H04L 67/22 |
| | | | | 345/440 |
| 2012/0042020 | A1 | 2/2012 | Kolari et al. | |
| 2012/0102113 | A1* | 4/2012 | Chartier | H04L 29/08072 |
| | | | | 709/204 |
| 2012/0131139 | A1* | 5/2012 | Siripurapu | H04L 65/60 |
| | | | | 709/217 |
| 2012/0265758 | A1 | 10/2012 | Han et al. | |
| 2012/0265806 | A1* | 10/2012 | Blanchflower | H04L 51/32 |
| | | | | 709/204 |
| 2012/0272160 | A1* | 10/2012 | Spivack | H04L 51/32 |
| | | | | 715/752 |
| 2012/0296991 | A1* | 11/2012 | Spivack | G06Q 50/01 |
| | | | | 709/206 |
| 2013/0036171 | A1 | 2/2013 | Gilbert | |
| 2013/0103667 | A1* | 4/2013 | Minh | H04L 51/32 |
| | | | | 707/709 |
| 2013/0191372 | A1* | 7/2013 | Lee | G06F 16/9535 |
| | | | | 707/722 |
| 2013/0297714 | A1* | 11/2013 | Basu | H04L 51/32 |
| | | | | 709/206 |
| 2013/0311485 | A1* | 11/2013 | Khan | G06F 16/335 |
| | | | | 707/748 |
| 2014/0040275 | A1* | 2/2014 | Dang | G06F 16/2228 |
| | | | | 707/741 |
| 2014/0244239 | A1* | 8/2014 | Nicholson | G06F 40/279 |
| | | | | 704/9 |
| 2014/0289231 | A1* | 9/2014 | Palmert | G06F 16/345 |
| | | | | 707/723 |
| 2015/0161216 | A1* | 6/2015 | Skiba | H04L 51/32 |
| | | | | 707/603 |
| 2015/0295876 | A1* | 10/2015 | Newman | H04L 51/22 |
| | | | | 709/206 |
| 2017/0142046 | A1* | 5/2017 | Abou Mahmoud | H04L 51/12 |
| 2018/0089314 | A1 | 3/2018 | Bauchot et al. | |
| 2018/0293607 | A1* | 10/2018 | Huddleston | G06Q 30/0242 |

OTHER PUBLICATIONS

Office Action (dated Mar. 10, 2017) for U.S. Appl. No. 14/541,728, filed Nov. 14, 2014.
Amendment (dated Jun. 7, 2017) for U.S. Appl. No. 14/541,728, filed Nov. 14, 2014.
Notice of Allowance (dated Oct. 11, 2017) for U.S. Appl. No. 14/541,728, filed Nov. 14, 2014.
Office Action (dated Sep. 27, 2018) for U.S. Appl. No. 15/830,444, filed Dec. 4, 2017.
Amendment (dated Dec. 24, 2018) for U.S. Appl. No. 15/830,444, filed Dec. 4, 2017.
Notice of Allowance (dated Feb. 5, 2019) for U.S. Appl. No. 15/830,444, filed Dec. 4, 2017.
312 amendment (dated Feb. 7, 2019) for U.S. Appl. No. 15/830,444, filed Dec. 4, 2017.

* cited by examiner

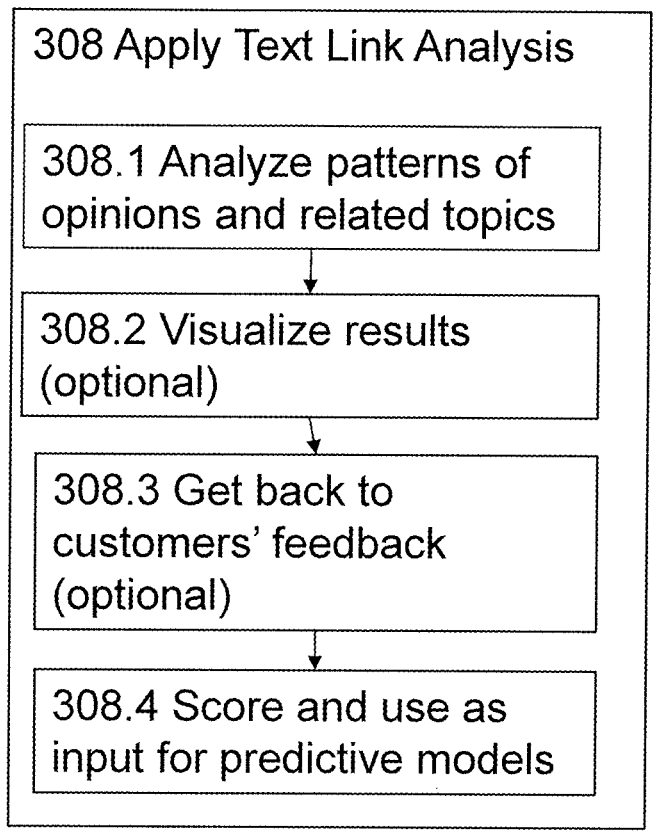
Example
Interest Value= Function of (Interest Concepts, Outgoing Actions, Message, Patterns)
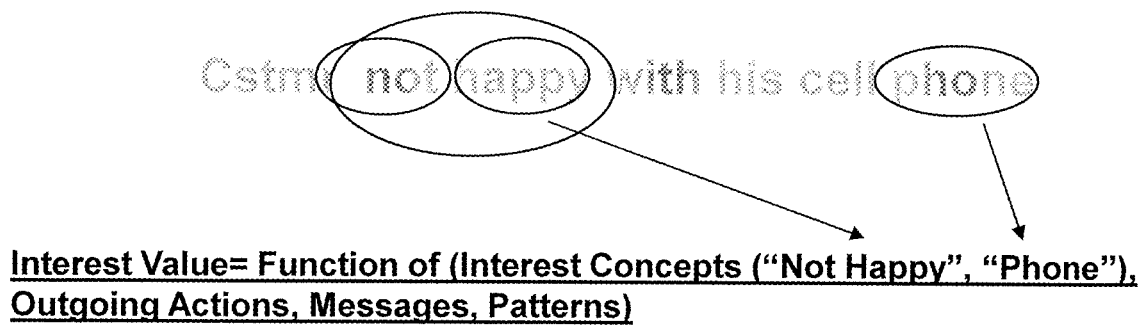
Interest Value= Function of (Interest Concepts ("Not Happy", "Phone"), Outgoing Actions, Messages, Patterns)
FIG. 3C

| Concept Dictionary 400 ||
| --- | --- |
| Concept | Keywords |
| Unhappiness | sad, angry, not happy, annoyed, frustrated |
| Mobile phone | Mobile phone, cell phone, cellular phone |
| Capital city | Paris, London |
| Running event | marathon, triathlon, |

FIG. 4A

| Concept Interest Table 450 ||
| --- | --- |
| Concept | Interest Value |
| Mobile phone and unhappiness | 1 |
| Capital city and running event | 2 |

FIG. 4B

| Flag | Source | Message |
|---|---|---|
| ✗ | W | LeWorld@LeWorld<br>At the polls in the background. |
| ✓ | W | LeWorld@LeWorld<br>The President hails the arrest of Paris marathon suspect. |
| ✗ | W | LeWorld@LeWorld<br>All the latest information on #Paris: the person is seriously injured. |
| ✓ | P | Paris Police Dept.<br>CAPTURED!!! The search is done. And justice has won. Person in custody. |
| ✓ | W | LeWorld@LeWorld<br>#Paris: The person was stopped. |
| ✗ | W | LeWorld@LeWorld<br>The American Scouts of Paris open the door to everyone. |
| ✓ | W | LeWorld@LeWorld<br>Latest information about #Paris. Person was located. |

FIG. 5

MESSAGING DIGEST

This application is a continuation application claiming priority to Ser. No. 15/830,444, filed Dec. 4, 2017, now U.S. Pat. No. 10,331,723 issued Jun. 25, 2019, which is a continuation of Ser. No. 14/541,728, filed Nov. 14, 2014, U.S. Pat. No. 9,904,728, issued Feb. 27, 2018.

TECHNICAL FIELD

The present invention relates to a method and apparatus for a messaging digest.

BACKGROUND

Twitter-like micro-blog social media services, and in also general purpose message broadcast services, can send many tweets or messages that have no relevance. Too many messages make it difficult to find messages of worth. Furthermore as a user's interests evolve over time then this difficulty is compounded; things that were of interest are no longer of interest and vice versa. Twitter® and Tweet® are registered trademarks of Twitter Corporation in the US and/or other countries.

Known prior art does not adapt to any change in the subjects of interest.

BRIEF SUMMARY

The present invention provides a method, and associated system, and an associated computer program product, wherein the method comprises:

identifying, by a processor of a computer system, an action to be subsequently performed on the message;

in response to said identifying the action, said processor extracting one or more word objects from the message;

said processor deriving a first combination of one or more concepts from the one or more word objects, wherein each concept of the one or more concepts is associated with at least one word object of the one or more word objects, and wherein each word object of the at least one word object is an instance of the associated concept;

said processor determining a first interest value associated with the first combination;

said processor determining that the first interest value is at least a specified first threshold value; and in response to said determining that the first interest value is at least the specified first threshold value, said processor updating a concept interest dataset, wherein the concept interest dataset prior to being updated comprises a plurality of combinations of at least one concept, wherein each concept of the at least one concept has been derived from a previous processing of messages, and wherein the updated concept interest dataset comprises the first combination and a cumulative interest value that encompasses the first interest value.

The present invention provides a message filtering method, said method comprising:

providing, by a processor of a computer system, one or more messages;

said processor extracting word objects from the one or more messages;

said processor deriving a combination of concepts from the extracted word objects;

said processor determining a first interest value associated with the combination of concepts;

said processor determining that the first interest value is at least a specified threshold value;

in response to said determining that the first interest value is at least the specified threshold value, said processor generating a message filter that comprises logical operators in conjunction with the combination of concepts; and said processor using the message filter to filter a set of messages to determine a group of messages from the set of messages such that the group of messages satisfy the message filter.

BRIEF DESCRIPTION OF THE DRAWINGS

Embodiments of the present invention will now be described, by way of example only, with reference to the following drawings.

FIGS. 3A, 3B and 3C are flow diagrams of a method for processing messages, in accordance with embodiments of the present invention.

FIG. 4A depicts an example concept dictionary, in accordance with embodiments of the present invention.

FIG. 4B depicts an example concept interest table, in accordance with embodiments of the present invention.

FIG. 5 is an example of a mixture of incoming messages, in accordance with embodiments of the present invention.

DETAILED DESCRIPTION

Figure 1:
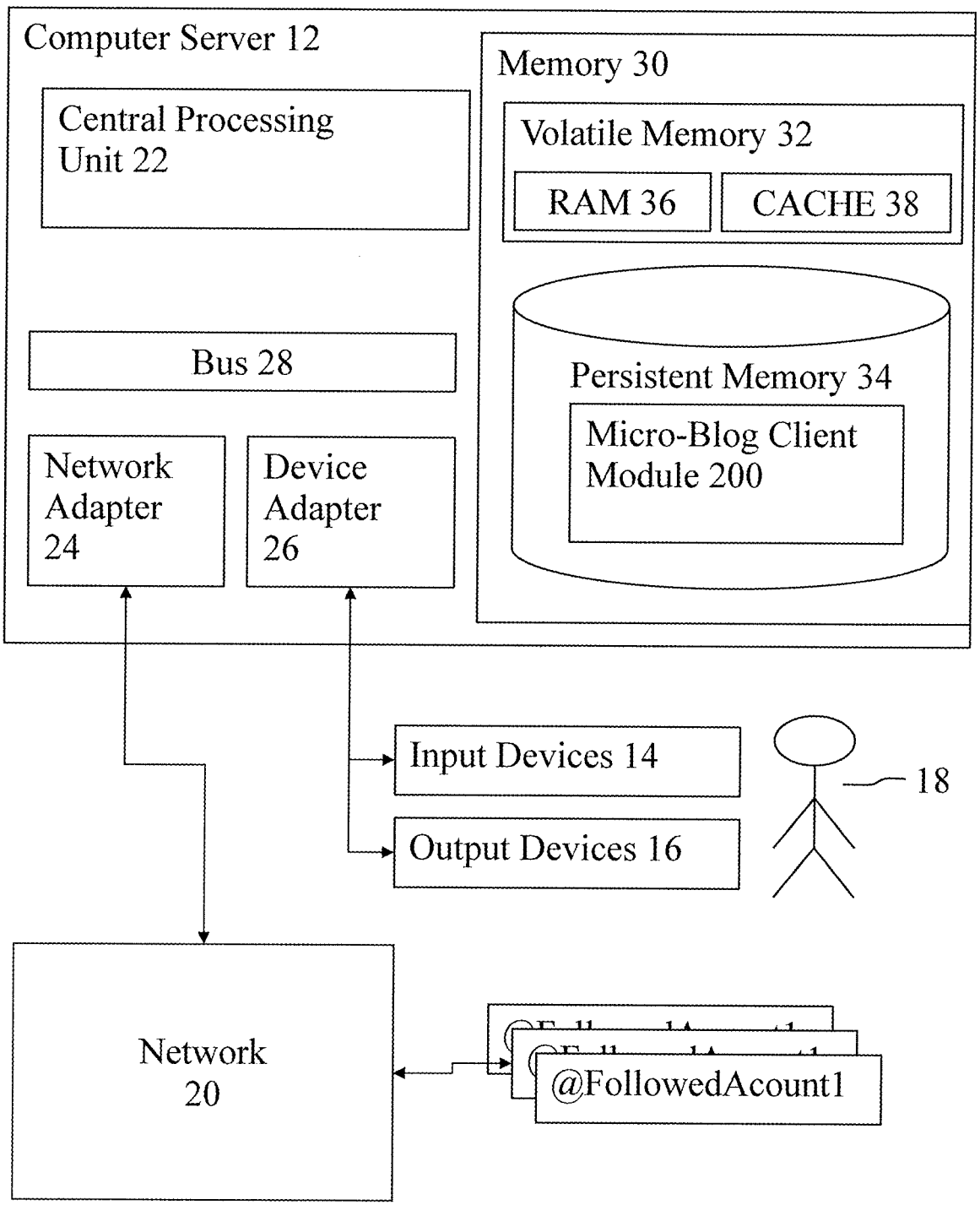
FIG. 1 depicts a computer system comprising a micro-blog client module, in accordance with embodiments of the present invention.

In a first aspect of the invention there is provided a system for digesting messages for an individual user from a source messaging service, said system comprising: a listener for identifying one or more outgoing user actions performed on a message in a messaging service by the said individual user; a concept engine for extracting one or more interest concepts from the message as to the meaning of the message; an interest engine for extracting an interest value from the message based on associated interest concepts and outgoing user actions; a database for adding the extracted interest concepts and values to a body of interest concepts and values; a predictive model for deploying the interest concepts and values; and a filtered messaging service created by using the predictive model to filter the messages from the source messaging service.

In a second aspect of the invention there is provided a method for digesting messages from a source messaging service for an individual user, said method comprising: identifying one or more outgoing user actions performed on a message in a messaging service; extracting one or more interest concepts from the message as to the meaning of the message; extracting an interest value from the message based on associated interest concepts and outgoing user actions; adding the extracted interest concepts and values to a body of interest concepts and values; deploying the interest concepts and values to a predictive model; and providing a filtered messaging service using the predictive model to filter the messages from the source messaging service.

Based on the outgoing information set the embodiments build a set of filters allowing current interest concepts to be identified.

The embodiments have an effect that operates at a machine and/or system level of a computer and below an overlying application level so that the effect is transparent to a user. Moreover, a user does not need to be prompted to specify any information.

The embodiments have an effect that results in the computer being made to operate in a new way that is adaptive and evolves over time to user interests.

Advantageously an outgoing user action comprises a consultation of the message and an appropriate interest value is given.

More advantageously an outgoing user action comprises a period of time that the message is in focus and an appropriate interest value is given.

Yet more advantageously an outgoing user action comprises forwarding or retweeting of the message and an appropriate interest value is given.

Still more advantageously an outgoing user action comprises selecting a hyperlink within the message and an appropriate interest value is given.

Extraction of one or more concepts may comprise using the content of selected hyperlinked data or page in the message.

Extraction of one or more concepts may comprise performing sentiment analysis on the message and the content of selected hyperlinked data or page in the message.

An interest value may diminish as time passes if no more interest in the interest concept is identified.

An interest concept may be phased out after a threshold period has passed and no more interest in the concept is identified.

A separate messaging account may be created for the filtered messaging service. The client can view the full set of messages by logging on to the source message service as normal or can view the subset by logging onto the filtered messaging service using the separate messaging account. The filtered messaging service provides the same user experience as a source messaging service.

In a third aspect of the invention there is provided a computer program product for digesting messages, the computer program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web or an application store.

In a fourth aspect of the invention there is provided a computer program stored on a computer readable medium and loadable into the internal memory of a computer, comprising software code portions, when said program is run on a computer, for performing all the steps of the method claims In a fifth aspect of the invention there is provided a data carrier aspect of an embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

FIG. 1 depicts a computer system 10 comprising a microblog client module 200, in accordance with embodiments of the present invention. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34 which may include, in one embodiment, read-only (ROM). Examples of volatile memory 32 are random access memory (RAM) 36 and cache memory 38. Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces.

As will be further depicted and described below, memory 30 comprises micro-blog client module 200 configured to carry out the functions of embodiments of the present invention. In one embodiment, ROM in the memory 30 stores the micro-blog client module 200 and/or the message filtering method depicted in FIG. 6 which enables the computer server 12 to function as a special purpose computer specific to the micro-blog client module 200 and/or the message filtering method. Further program modules that support embodiments of the present invention but are not shown include firmware, boot strap program, operating system, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Figure 2:
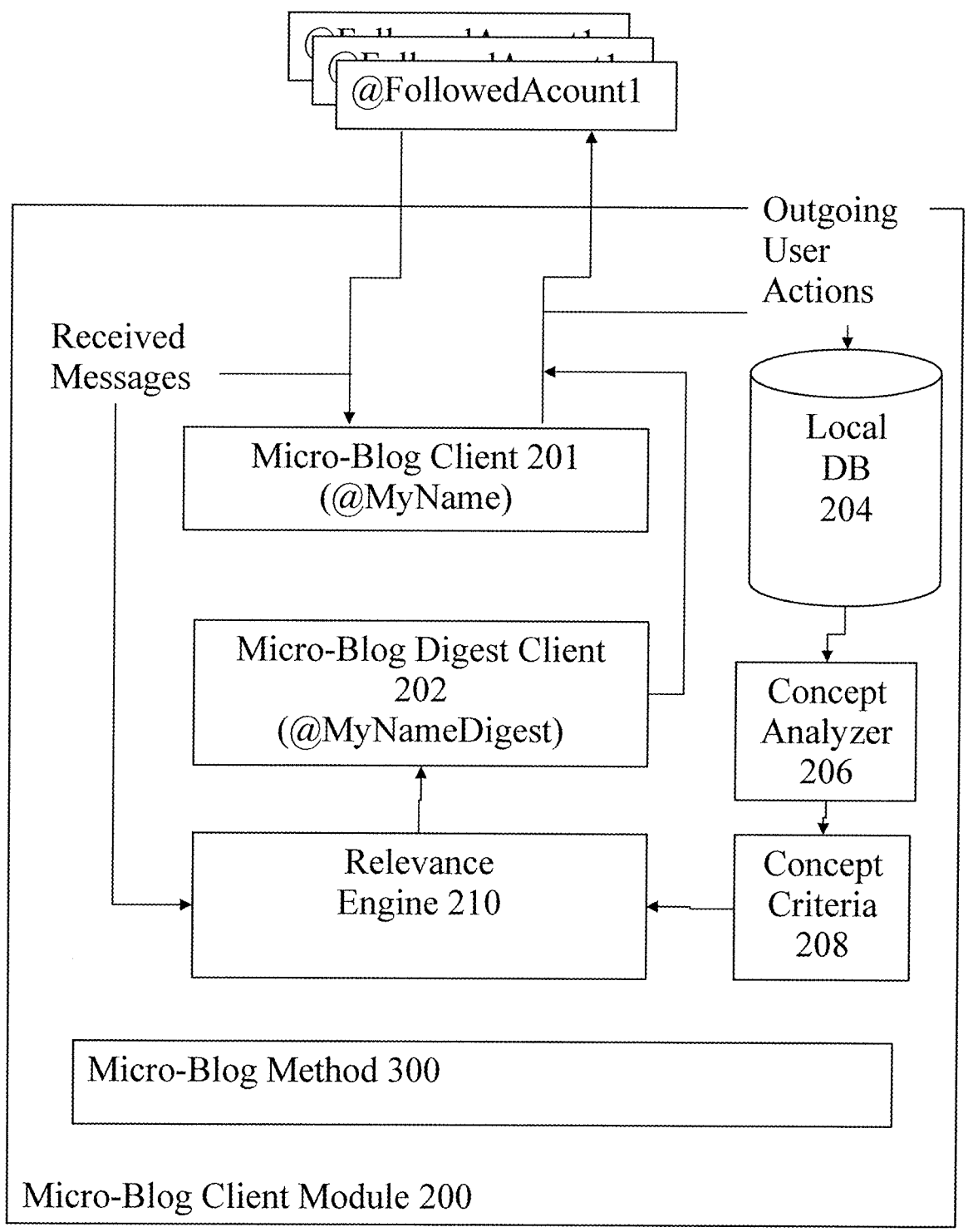
FIG. 2 is a diagram of the micro-blog client module in FIG. 1, in accordance with embodiments of the present invention.

FIG. 2 is a diagram of the micro-blog client module in FIG. 1, in accordance with embodiments of the present invention. Referring to FIG. 2, micro-blog client module 200 comprises the following components: micro-blog client 201 (corresponding to an @MyName messaging service account); micro-blog digest client 202 (corresponding to an @MyNameDigest messaging service account); local database 204; concept analyzer 206; concept criteria 208; relevance engine 210 and micro-blog method 300. User 18 can either log on to micro-blog client 201 using an @MyName identification or on the micro-blog digest client 202 using an @MyNameDigest identification.

Micro-blog client 201 is an agent that receives all messages from all subscribed messaging services and identifies all outgoing actions such as message reads, deletes, forwards, sends (including tweets and re-tweets). Micro-blog client 201 also browses data or pages referenced by hyperlinks within those visited tweets. Micro-blog client 201 forwards all outgoing actions to local database 204.

Micro-blog digest client 202 is for displaying only a filtered list of all the received messages. Outgoing actions performed on the filtered list are propagated back to the originating messaging service and local database 204 just as with micro-blog client 201. The digest client is fed only with the most relevant messages, as filtered by relevance engine 210.

Both micro-blog client 201 and micro-blog digest client 202 have an identical user interface and user experience.

Local database 204 is a local repository for storing messages and outgoing actions.

Concept analyzer 206 is for extracting concepts from the messages and actions. Sentiment analysis techniques may be advantageously used for extracting concepts of interest.

An example of a concept analyzer comprises a concept dictionary.

FIG. 4A depicts an example concept dictionary 400, in accordance with embodiments of the present invention. The concept dictionary 400 comprises a column of interest concepts and a column of one or more keywords and/or one or more key phrases associated with each concept, which may appear in a message. Spotting an unhappiness concept in a message could require identification of one or more unhappiness concept keyword roots including: sad; angry; not happy; annoyed; and/or frustrated. Spotting a mobile phone concept would require identification of one or more mobile phone concept keyword roots including: mobile phone, cell phone, and/or cellular phone. A concept of capital city is associated with the keywords Paris and/or London. A concept of a running event is associated with the keywords of a marathon and/or a triathlon. Concept analyzer 206 would extract concepts from the message after a user selection of the message and then give the message and the concepts an interest value of 1, for example, if the concepts did not already have an interest value (e.g., not having an entry in Table 450, described infra in conjunction with FIG. 4B). If the concepts already have an interest value (e.g., having an entry in Table 450), then the concept analyzer might add 1 to the previous interest value of 1 so that the new relevance value would be 2.

A concept is defined as a word or phrase pertaining to a topic or subject. A word object is defined as a word or phrase that is an instance of a concept. For example, the concept dictionary 400 includes the concept of unhappiness (i.e., a topic or subject of unhappiness) having instances denoted by the word objects of sad, angry, not happy, annoyed, and frustrated. As another example, the concept dictionary 400 includes the concept of capital city (i.e., a topic or subject of capital city) having instances denoted by the word objects of Paris and London. Thus a concept is broader than each of its instances and has a scope that includes its instances.

In one embodiment, the concept has only one instance so that the concept is a word object that is the only one instance. An example of a concept having only one instance "capital city of France" whose only instance is Paris. Another such example is the concept of "electron" whose only instance is "electron".

Although the concept dictionary 400 stores concepts and associated word objects in the format of a table, the scope of the present invention generally encompasses a concept dictionary dataset that stores the concepts and associated word objects in any known format of a data structure. Thus, the concept dictionary 400 is an instance or special case of a concept dictionary dataset of the present invention.

FIG. 4B depicts an example concept interest table 450, in accordance with embodiments of the present invention. The concept interest table 450 includes concepts that have been extracted in relation to user actions and have associated interest values. The interest value is incremented on any user action, so that the combination of mobile phone and unhappiness concepts have an interest value of 1 because these concepts have been located and extracted once from a message acted on by the user. The combination of capital city and running event concepts have an interest value of 2 because these concepts have been located twice in one or more messages acted on by the user. The concept interest table 450 includes (i) a first combination of the concepts of "mobile phone" and "unhappiness" and (ii) a second combination of the concepts of "capital city" and "running event". Generally, the concept interest table 450 may include both single concepts and combinations of two or more concepts (e.g., a combination of two concepts, a combination of three concepts, etc.) from the concept interest dictionary 400 if found in messages that experienced user actions. For each concept or combination of two or more concepts, the concept interest table 450 includes an associated interest value that has accrued from appearances of each such concept or combination of concepts, as determined from analysis of messages processed in accordance with the method depicted in FIG. 3A. A dataset is defined as a structured collection of data, such as a table, a file, a matrix, etc.

Although the concept interest table 450 stores concepts and associated interest values in the format of a table, the scope of the present invention generally encompasses a concept interest dataset that stores the concepts and associated interest values in any known format of a data structure. Thus, the concept interest table 450 is an instance or special case of a concept interest dataset of the present invention.

Returning to FIG. 2, concept criteria 208 is for keeping concepts current. This process is continuously executed, with an aging mechanism keeping the concepts current. The most recent concepts and outgoing actions receive a higher interest value than the older ones. Concepts are also aged out after a threshold period such that no or only a small interest value is given. Continuing the previous example, if there is no user action on that message or another message containing those two concepts after, for example, a week then the interest value of the two concepts in the concept interest table 450 will deteriorate, for example, by deducting 1 from the interest value so that those concepts and corresponding messages will become less important over time. Finally the interest value might reduce to zero or a negative value over time.

Relevance engine 210 is for determining interest values for interest concepts. For each message received by @MyName from a followed service, a relevance evaluation is run to determine the interest value of the message using the associated interest concepts. If the interest value is the same or exceeds a specified threshold, then this message is selected as an incoming message for micro-blog digest client 202. In one embodiment, the threshold is zero.

Figure 3A:
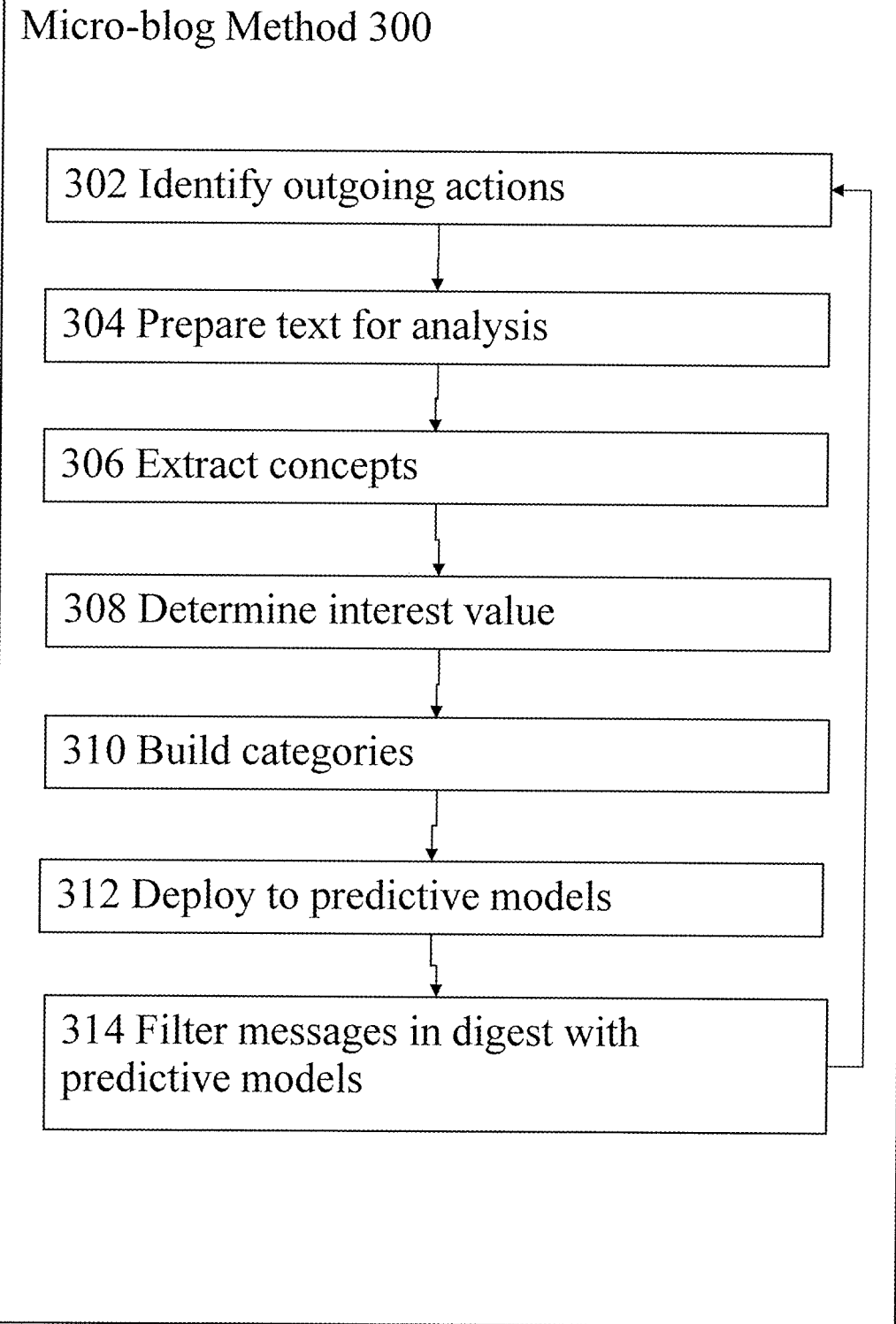
Figure 3B:
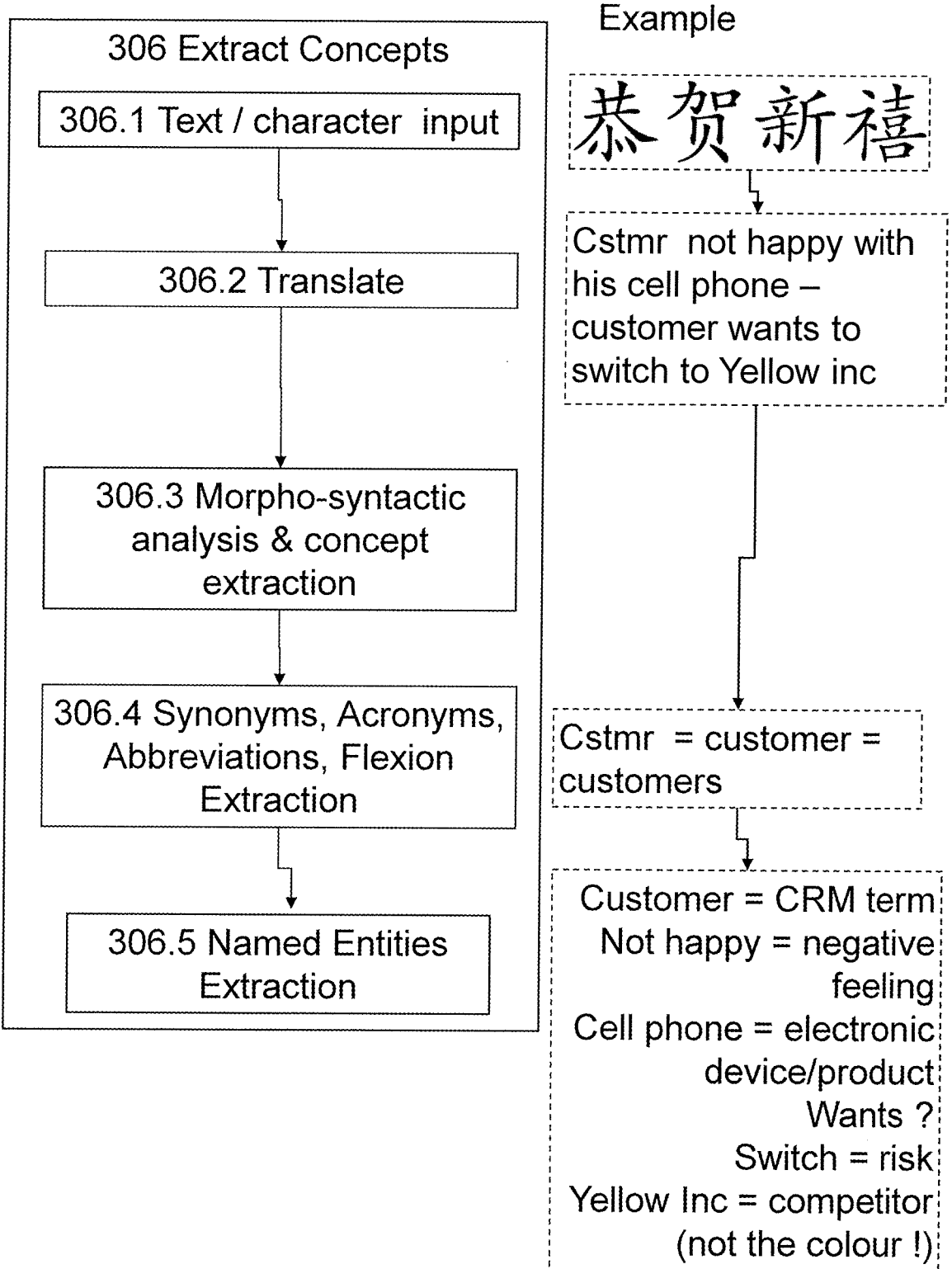

FIGS. 3A, 3B, and 3C are flow diagrams of a method for processing messages, in accordance with embodiments of the present invention. Micro-blog method 300 performs the method for processing messages of FIGS. 3A, 3B, and 3C.

Referring to FIG. 3A, micro-blog method 300 comprises logical process steps 302 to 314.

Step 302 is for identifying an outgoing action or actions on a message. An outgoing action on a message is an action to be subsequently performed on the message. Outgoing actions include: hovering over a message, selecting a message, reading a message from memory or storage, opening a message, editing a message, sending a message, forwarding a message, copying the message, selecting a hyperlink within the message. The preceding actions are indicative of a positive interest in the message and therefore trigger a positive interest value (e.g., +1) in interest concepts, and combinations of interest concepts, in the message.

Outgoing actions also include: deleting a message and no user action on a message for at least a specified amount of time spent on a message. The preceding actions are indicative of a negative interest in the message and therefore trigger a negative interest value (e.g., −1) in interest concepts, and combinations of interest concepts, in the message.

Step 304 is for preparing text of the message for analysis.

Step 306 is for extracting interest concepts from the text prepared in step 304. Step 306 is described in more detail with respect to FIG. 3B. In one embodiment, step 306 searches for and may find and extract one or more word objects (i.e., keywords and/or key phrases) from the message and determines whether any of the found keywords appear in the concept dictionary 400. The interest concepts in the message are those concepts in concept dictionary 400 having associated keywords in the concept dictionary 400 that have been found in the message. For example, if the message includes "not happy" and "Paris", then step 306 will determine, from the concept dictionary 400, that the message includes the concepts of "unhappiness" and "capital city".

Step 308 is for applying text link analysis to determine the interest value for a concept or a combination of concepts in the message. A combination of concepts is defined to be one or more concepts and may consist of a single concept, at least one concept, or a plurality of concepts. Step 308 is described in more detail with respect to FIG. 3C. Step 310 is for storing the interest concepts and interest values, in response to having determined that the interest values are at least a specified threshold value. Interest concepts are stored individually, or together in combinations, in concept interest table 450, along with an associated interest value. The concept interest table 450 is updated with the interest value found in step 308 for the concept or combination of concepts found in step 306, or is not updated if no concept is found in step 306.

In one embodiment, step 306 finds only one concept in the message, which results in step 310 (i) adding the only one found concept to concept interest table 450 with the interest value determined in step 308, if the only one found concept does not currently exist in the concept interest table 450; or (ii) incrementing the only one found concept in concept interest table 450 with the interest value determined in step 308, if the only one found concept currently exists in the concept interest table 450.

In one embodiment, step 306 finds only N concepts in the message (N is at least 2), which results in step 310 (i) adding a combination of the N found concepts to concept interest table 450 with the interest value determined in step 308, if the combination of N found concepts does not currently exist in the concept interest table 450; or (ii) incrementing the combination of N found concepts in concept interest table 450 with the interest value determined in step 308, if the combination of N found concepts currently exists in the concept interest table 450.

Step 312 is for deploying the interest concepts and associated interest values in concept interest table 450 to predictive models. In one embodiment, a predictive model in a simple form is a set of one or more filters such that the predictive model can filter a complete set of messages to provide a filtered message service. Simple filters are just one way of building a predictive model and that more sophisticated models methods such as hidden Markov models and neural networks could be used. A filter based implementation could take the form of " . . . if a message includes interest concept x,y,z then include the message in the results and associate the message with the interest value". A set of filters may rank the messages according to the associated interest values. A set of filters can be built from a set of interest concepts that are ranked according to interest value.

Step 314 is for filtering messages in the digest in accordance with the predictive models and then continuing to loop back to step 302.

Figure 6:
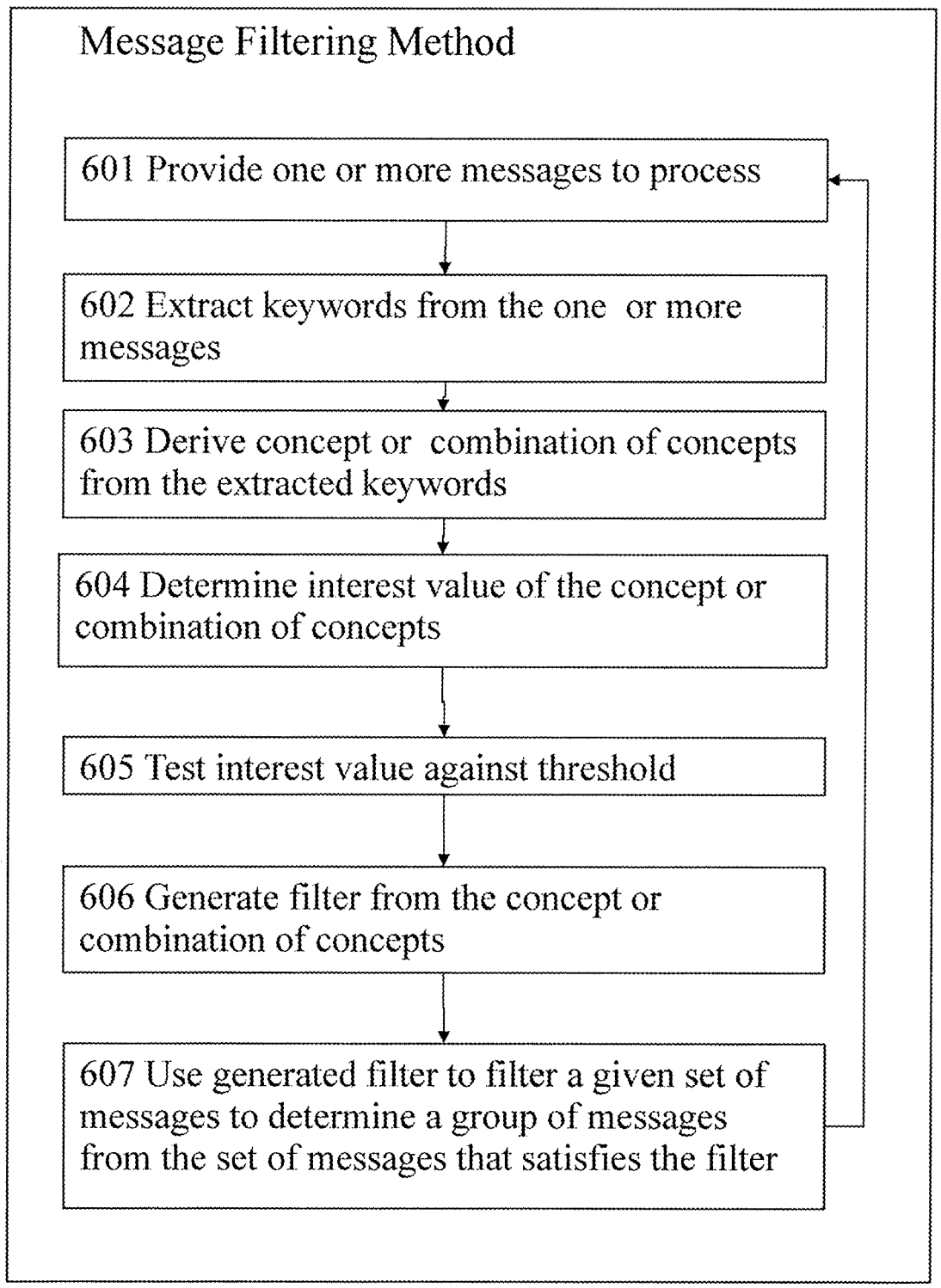
FIG. 6 is a flow diagram of a message filtering method, in accordance with embodiments of the present invention.

In one embodiment, steps 312 and 314 may be implemented in accordance with steps 606 and 607 of the message filtering method depicted in FIG. 6 which is described infra.

Referring to FIG. 3B, method 306 comprises logical process steps 306.1 to 306.5 with corresponding example states adjacent the steps.

Step 306.1 is for receiving text or character input. In the example of FIG. 3B, four Chinese characters are input but any text and any language could be input.

Step 306.2 is for translating the text. The example translation is "Cstmr not happy with his cell phone customer wants to switch to Yellow Inc." is an example only.

Step 306.3 is for performing concept extraction. For example, a concept would could comprise a certain combination of dictionary keywords identified in the text. A more complex concept might comprise a more grammatically correct combination of keywords involving a subject, object, verb and/or adjectives and use morpho-syntactic analysis to differentiate between grammatical words.

Step 306.4 is for extracting the synonyms, acronyms, abbreviations, and flexions. In the example "Cstmer" is equal to "customer" is equal to "customers". In the simple example, all synonyms, acronyms, abbreviations, and flexions are keywords in the dictionary that could represent the concept.

Step 306.5 is for extracting the named entities. In the example: "customer" is taken to mean a customer relationship management (CRM) term; "not happy" is taken to mean a negative feeling; "cell phone" is identified as an electronic device/product; "wants" is not identified; "switch" is taken to mean a risk; "Yellow Inc." is identified as a competitor and not the color.

Referring to FIG. 3C, method 308 comprises logical process steps 308.1 to 308.4 with a corresponding example.

Step 308.1 is for analyzing patterns of messages and associated interest concepts and user outgoing actions. This step is for identifying both existing interest concepts and new interest concepts.

Step 308.2 is for displaying results. This is an optional step.

Step 308.3 is for receiving user feedback. For instance, a concept interest table (e.g., Table 450) could be displayed so that a user could see the effect of user action on the filtering. This is an optional step. For instance, the display of the concept interest table may provide user input to directly manipulate the concepts and interest values.

Step 308.4 is for forming or updating an interest value parameter based expression based on a function of the patterns of messages, interest concepts and user outgoing actions. In the example below the main concepts: "not happy" and "phone" are inputs for a corresponding parameter based interest value expression. In a simple example, the expression gives a higher value for messages that contain both a concept of unhappiness ("not happy") and a concept of a mobile phone as opposed to a message that contains only one or no concepts. The assumption made by the embodiments is that multiple concepts in the same message are linked such that an unhappiness concept would be linked to a mobile phone concept to denote some unhappiness related to a mobile phone. In one embodiment, the interest value may be determined by the following equation.

$$\text{Interest Value} = \text{Function of (Concepts ("Not Happy", "Phone"), Outgoing Actions, Messages, Patterns)}$$

For instance, the interest value could be a binary a value (1) added to an existing interest value for a previously extracted unhappiness concept and mobile phone concept. Alternatively, fuzzy matching could be used where there is some uncertainty as to whether the message contains the concepts. Therefore "not happy" in the message might only be 80% matched to a unhappiness concept and "phone" might only be 50% matched to a mobile phone concept then the interest value might only be given a partial increment of the average, say 65% or 0.65.

In one embodiment, the interest value is independent of the number (N) of concepts combined, so that the same interest value (e.g., +1) is applied to one concept and to each concept of a combination of N concepts (N at least 2).

In one embodiment, the interest value is linearly proportional to the number (N) of concepts combined (e.g., the interest value is +N for a combination of N concepts, wherein N is at least 1, and wherein N=1 corresponds to one concept).

In one embodiment, the interest value is non-linearly dependent on the number (N) of concepts combined (e.g., the interest value is $+N^P$ for a combination of N concepts, wherein N is at least 1 such that N=1 corresponds to one concept, and wherein P is any real number or integer unequal to 0 and unequal to 1, such as P=2, P=3, P=0.5, P=−0.5, P=⅓, etc.).

Referring to FIG. 4A, an example concept dictionary 400 used or part of concept analyser comprises two columns: one for concepts and one for associated keywords. A concept of unhappiness is associated with keywords: sad; angry; not happy; annoyed; and/or frustrated. A concept of mobile phone is associated with keywords: mobile phone; and/or cell phone. A concept of capital city is associated with Paris and/or London. A concept of a running event is associated with a marathon and/or a triathlon.

FIG. 5 is an example of a mixture of incoming messages, in accordance with embodiments of the present invention. FIG. 5 illustrates filtering messages. In FIG. 5, a list of messages from two different sources P (Paris Police Department) and W (Le World magazine) are listed in a table.

In the example of FIG. 5, a user has previously selected or performed a user action on a message such as in the second message in the list: "The President hails the arrest of Paris marathon suspect". The user action communicates that the text of the message should be analyzed and concepts are extracted. In this case two separate keywords are found in the dictionary: 'Paris' and 'marathon' but no other words in the message are found in the dictionary. In this example, the keywords match concepts "Capital city" and "Running event" as shown in the concept dictionary 400.

Once the concepts are extracted or located again, the concepts are collected together and associated with an interest value or the interest value is incremented. From Table 450 in FIG. 4B, the capital city concept and the running event concept have an interest value of two which is more than a threshold of zero.

In a next stage, the collected concepts are used to build a message filter. For the present example, such a filter may take the form: "Select message if message contains: (Paris or London) and (triathlon or marathon)".

Next the filter is applied to a set of messages (e.g., the messages in FIG. 5) either as an alternative or default view or when selected by the user.

In this example, only messages in FIG. 5 that have keywords listed in a concept dictionary of the present invention (e.g., the concept dictionary 400) are flagged (i.e., checked). Messages that concern the Paris and marathon are flagged (i.e., checked) whereas messages that concern Paris only are not flagged (i.e., crossed) in this example. Therefore it can be seen that a message regarding Scouts in Paris is not flagged. All other messages that concern Paris and the marathon and are therefore flagged. Flagged messages are filterable but are not shown as filtered for ease of representation.

The preceding description of FIG. 5 is an example embodiment of a message filtering method described in FIG. 6.

FIG. 6 is a flow diagram of a message filtering method, in accordance with embodiments of the present invention. The method of FIG. 6 includes steps 601-607.

Step 601 provides one or more messages to process (e.g., one message, two messages, three messages, etc.), which may originate from any source or set of sources, such as from a user, from another computer, from output of executed program code, from a database table, from a file, etc.

Step 602 extracts word objects (i.e., keywords and/or key phrases) from the one or more messages, using techniques described supra for step 306 of FIGS. 3A and 3B.

Step 603 derives a concept or a combination of concepts from the extracted keywords using techniques described supra for step 306 of FIGS. 3A and 3B which may include use of a concept dictionary illustrated by the concept dictionary 400 in FIG. 4A.

Step 604 determines an interest value of the concept or combination of concepts, using techniques described supra for step 308 of FIG. 3A which may include obtaining the interest value from a concept interest table illustrated by the concept interest table 450 in FIG. 4B.

Step 605 tests the interest value against a specified or predetermined threshold, and if the interest value equals or exceeds the threshold, then step 606 is next executed.

Step 606 generates a message filter from the concept or combination of concepts. In one embodiment, the message filer http://www.epo.org/law-practice/legal-texts/guidelines.html comprises logical operators (e.g., and, or, not, etc.) in conjunction with the concept or combination of concepts derived in step 603.

Step 607 uses the message filter generated in step 606 to filter a given set of messages to determine an output group of messages from the set of messages such that the group of messages satisfy the message filter. The given set of messages may be any set of messages originating from any source or set of sources, such as from a user, from another computer, from output of executed program code, from a database table, from a file, etc. Satisfying the message filter by the given set of messages may comprise satisfying selection criteria specified by the message filter.

The method may loop back to step 601 to process another one or more messages similarly.

In one embodiment, steps 606 and 607 may be employed to implement steps 312 and 314 of the method for processing messages depicted in FIG. 3A.

Figure 7:
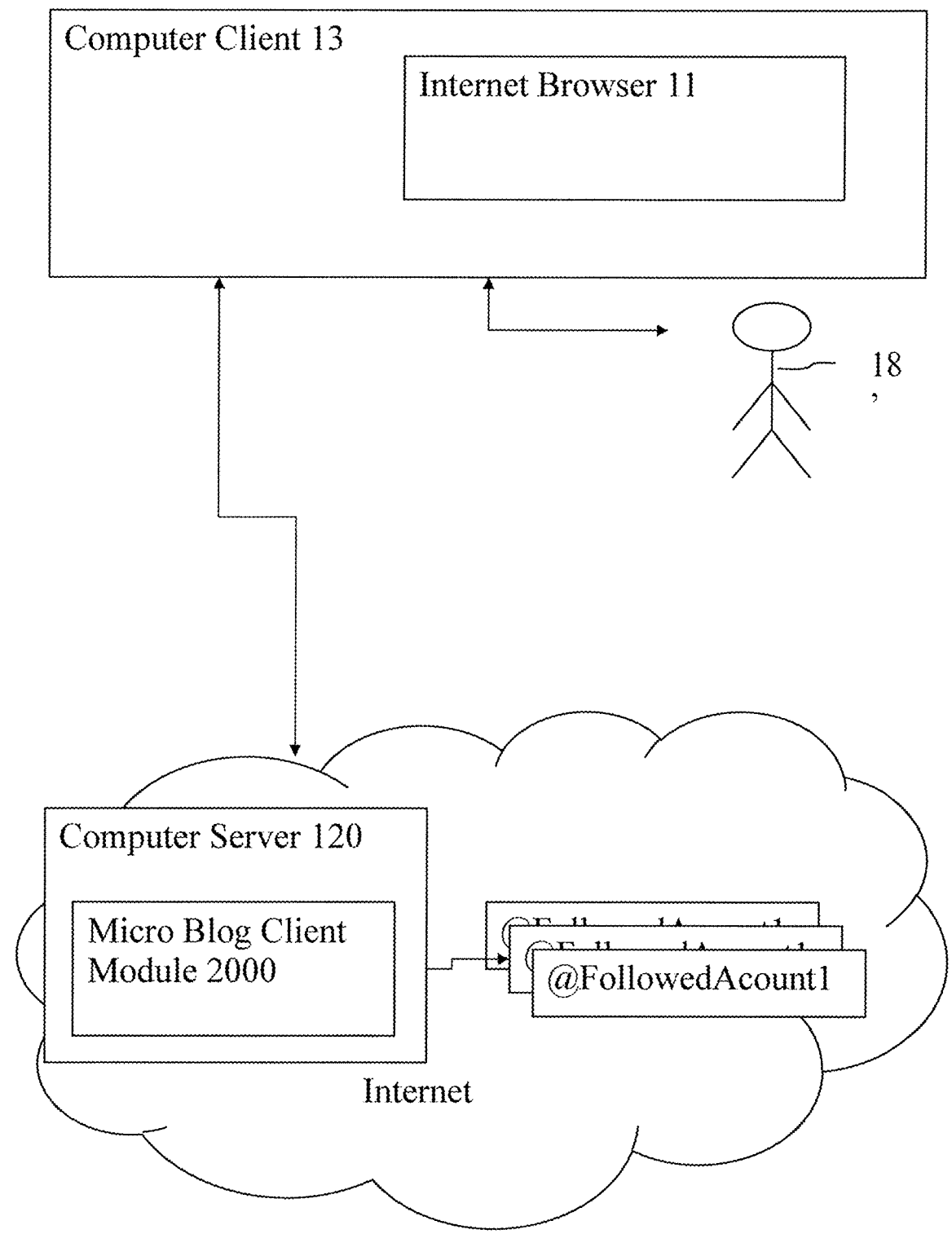
FIG. 7 is a deployment diagram of a cloud computing environment, in accordance with embodiments of the present invention.

FIG. 7 is a deployment diagram of a cloud computing environment, in accordance with embodiments of the present invention. FIG. 7, an example of an alternative embodiment may be realized in the form of a client/server system on the Internet comprising computer server 120 and computer client 13. Computer server 120 connects to computer client 13 via the Internet protocols. Computer client 13 comprising Internet browser 11 for output and input with user 18. In this client server embodiment, micro-blog client module 2000 is located and processed on the computer server 120. In this client server embodiment, the method is provided as a remote service to a client.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored in one or more hardware storage media or in one or more hardware storage devices.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention. Accordingly, the appended claims are intended to encompass all such modifications and changes as fall within the true spirit and scope of the present invention.

What is claimed is:

1. A method, said method comprising:
   determining, by a processor of a computer system, a first interest value associated with a first combination of one or more concepts derived from one or more word objects extracted from a message on which an action is to be performed;
   said processor determining that the first interest value is at least a specified first threshold value; and
   in response to said determining that the first interest value is at least the specified first threshold value, said processor updating a concept interest dataset, wherein the concept interest dataset prior to being updated comprises a plurality of combinations of at least one concept, wherein each concept of the at least one concept has been derived from a previous processing of messages, and wherein the updated concept interest dataset comprises the first combination and a cumulative interest value that encompasses the first interest value.

2. The method of claim 1, wherein each concept of the one or more concepts is associated with at least one word object of the one or more word objects.

3. The method of claim 2, wherein each word object of the at least one word object is an instance of the associated concept.

4. The method of claim 1, said method further comprising:
   said processor extracting a group of word objects from one or more messages;
   said processor deriving a second combination of concepts from the extracted group of word objects;
   said processor using the updated concept interest dataset to determine a second interest value associated with the second combination of concepts;
   said processor determining that the second interest value is at least a specified second threshold value; and
   in response to said determining that the second interest value is at least the specified second threshold value, said processor generating a message filter that comprises logical operators in conjunction with the second combination of concepts; and
   said processor using the message filter to filter a set of messages to determine a group of messages from the set of messages such that the group of messages satisfy the message filter.

5. The method of claim 1, wherein the plurality of combinations does not include the first combination, and wherein the cumulative interest value consists of the first interest value.

6. The method of claim 1, wherein the plurality of combinations includes the first combination, and wherein the cumulative interest value consists of the first interest value added to a value of the first combination that existed in the concept interest dataset prior to said updating.

7. The method of claim 1, wherein a concept dictionary dataset comprises concepts and associated word objects, wherein said deriving the first combination comprises:
   said processor finding in the concept dictionary dataset an occurrence of each word object of the one or more word objects; and
   said processor locating in the concept dictionary dataset the concept associated with each word object whose occurrence was found in the concept dictionary dataset, wherein the first combination consists of the located concepts associated with each word object whose occurrence was found in the concept dictionary dataset.

8. The method of claim 1, wherein the first interest value is either a positive or negative number in dependence on the action.

9. The method of claim 1, wherein N denotes a total number of concepts of the one or more concepts in the first combination, and wherein N is at least 2.

10. The method of claim 9, wherein the first interest value is independent of N.

11. The method of claim 9, wherein the first interest value is linearly proportional to N.

12. The method of claim 9, wherein the first interest value is non-linearly dependent on N.

13. A computer program product, comprising a computer readable medium having computer readable program code stored therein, said computer readable medium not being a signal, said program code containing instructions which, upon being executed by a processor of a computer system, implement a method, said method comprising:
   said processor determining a first interest value associated with a first combination of one or more concepts derived from one or more word objects extracted from a message on which an action is to be performed;
   said processor determining that the first interest value is at least a specified first threshold value; and
   in response to said determining that the first interest value is at least the specified first threshold value, said processor updating a concept interest dataset, wherein the concept interest dataset prior to being updated comprises a plurality of combinations of at least one concept, wherein each concept of the at least one concept has been derived from a previous processing of messages, and wherein the updated concept interest dataset comprises the first combination and a cumulative interest value that encompasses the first interest value.

14. The computer program product of claim 13, wherein each concept of the one or more concepts is associated with at least one word object of the one or more word objects.

15. The computer program product of claim 14, wherein each word object of the at least one word object is an instance of the associated concept.

16. The computer program product of claim 13, said method further comprising:
   said processor extracting a group of word objects from one or more messages;
   said processor deriving a second combination of concepts from the extracted group of word objects;
   said processor using the updated concept interest dataset to determine a second interest value associated with the second combination of concepts;
   said processor determining that the second interest value is at least a specified second threshold value; and
   in response to said determining that the second interest value is at least the specified second threshold value, said processor generating a message filter that comprises logical operators in conjunction with the second combination of concepts; and
   said processor using the message filter to filter a set of messages to determine a group.

17. A computer system comprising a processor, a memory coupled to the processor, and a computer readable storage device coupled to the processor, said storage device containing program code which, upon being executed by the processor via the memory, implements a method, said method comprising:

said processor determining a first interest value associated with the first combination a first combination of one or more concepts derived from one or more word objects extracted from a message on which an action is to be performed;

said processor determining that the first interest value is at least a specified first threshold value; and in response to said determining that the first interest value is at least the specified first threshold value, said processor updating a concept interest dataset, wherein the concept interest dataset prior to being updated comprises a plurality of combinations of at least one concept, wherein each concept of the at least one concept has been derived from a previous processing of messages, and wherein the updated concept interest dataset comprises the first combination and a cumulative interest value that encompasses the first interest value.

18. The computer system of claim 17, wherein each concept of the one or more concepts is associated with at least one word object of the one or more word objects.

19. The computer system of claim 18, wherein each word object of the at least one word object is an instance of the associated concept.

20. The computer system of claim 17, said method further comprising:

said processor extracting a group of word objects from one or more messages;

said processor deriving a second combination of concepts from the extracted group of word objects;

said processor using the updated concept interest dataset to determine a second interest value associated with the second combination of concepts;

said processor determining that the second interest value is at least a specified second threshold value; and in response to said determining that the second interest value is at least the specified second threshold value, said processor generating a message filter that comprises logical operators in conjunction with the second combination of concepts; and said processor using the message filter to filter a set of messages to determine a group.

\* \* \* \* \*